United States Patent
Kawata

(10) Patent No.: US 9,500,915 B2
(45) Date of Patent: Nov. 22, 2016

(54) LIQUID CRYSTAL DISPLAY DEVICE

(71) Applicant: Japan Display Inc., Minato-ku (JP)

(72) Inventor: Yasushi Kawata, Tokyo (JP)

(73) Assignee: Japan Display Inc., Minato-ku (JP)

( * ) Notice: Subject to any disclaimer, the term of this patent is extended or adjusted under 35 U.S.C. 154(b) by 0 days.

(21) Appl. No.: 14/711,878

(22) Filed: May 14, 2015

(65) Prior Publication Data

US 2015/0338706 A1    Nov. 26, 2015

(30) Foreign Application Priority Data

May 20, 2014  (JP) .................................. 2014-104199

(51) Int. Cl.
*G02F 1/1343*    (2006.01)
*G02F 1/1333*    (2006.01)
(Continued)

(52) U.S. Cl.
CPC ... *G02F 1/134336* (2013.01); *G02F 1/133345* (2013.01); *G02F 1/133784* (2013.01);
(Continued)

(58) Field of Classification Search
CPC .............. G09G 3/3614; G09G 3/3648; G09G 3/3655; G09G 3/3677; G09G 3/3688; G09G 3/3659; G09G 3/3607; G09G 3/36; G09G 3/3685; G09G 3/2074; G09G 3/3696; G09G 2300/0876; G09G 2300/0426; G09G 2300/0447; G09G 2300/0443; G09G 2300/0439; G09G 2300/08; G09G 2300/0823; G09G 2310/0248; G09G 2310/0267; G09G 2310/0278; G09G 2310/0264; G02F 1/136; G02F 1/1343; G02F 1/136213; G02F 1/133707; G02F 1/13624; G02F 1/136286; G02F 1/134336; G02F 1/134309; G02F 1/136227; G02F 1/133345; G02F 1/1362; G02F 1/1368; G02F 1/13306; G02F 1/1337; G02F 2001/134345; G02F 2001/134354; G02F
(Continued)

(56) References Cited

U.S. PATENT DOCUMENTS

| 6,268,894 | B1 | 7/2001 | Aoki et al. | |
| 6,665,034 | B2* | 12/2003 | Suzuki | G02F 1/133753 |
| | | | | 349/123 |
| 2004/0227881 | A1* | 11/2004 | Okazaki | G02F 1/1337 |
| | | | | 349/123 |

FOREIGN PATENT DOCUMENTS

| JP | 05-127195 | 5/1993 |
| JP | 2004-046249 | 2/2004 |

* cited by examiner

*Primary Examiner* — Thoi Duong
(74) *Attorney, Agent, or Firm* — Oblon, McClelland, Maier & Neustadt, L.L.P.

(57) ABSTRACT

According to one embodiment, a liquid crystal display device includes a liquid crystal layer, a first pixel electrode, a second pixel electrode and an auxiliary electrode. The first pixel electrode includes a first corner portion, a second corner portion and a side edge portion. A first video signal is input in the first pixel electrode. A second video signal of polarity different from polarity of the first video signal is input in the second pixel electrode. The auxiliary electrode includes a first region and a second region. A voltage of the same polarity as the polarity of the first video signal is supplied to the auxiliary electrode.

8 Claims, 8 Drawing Sheets

(51) Int. Cl.
*G02F 1/1337* (2006.01)
*G09G 3/36* (2006.01)
*G02F 1/1362* (2006.01)

(52) U.S. Cl.
CPC . *G09G 3/3648* (2013.01); *G02F 2001/136218* (2013.01); *G09G 2300/0452* (2013.01)

(58) Field of Classification Search
CPC ................... 2001/136218;G02F 2001/133742; G02F 2001/1676; G02F 1/133773; G02F 1/136272; G02F 2201/123; G02F 2201/52; G02F 1/133784; H01L 29/4908; H01L 29/41733; H01L 23/5223
USPC ........ 345/87, 103, 92; 349/39, 143, 37, 139, 349/138, 43, 129, 38, 144, 33, 48, 123, 147, 349/42, 126
See application file for complete search history.

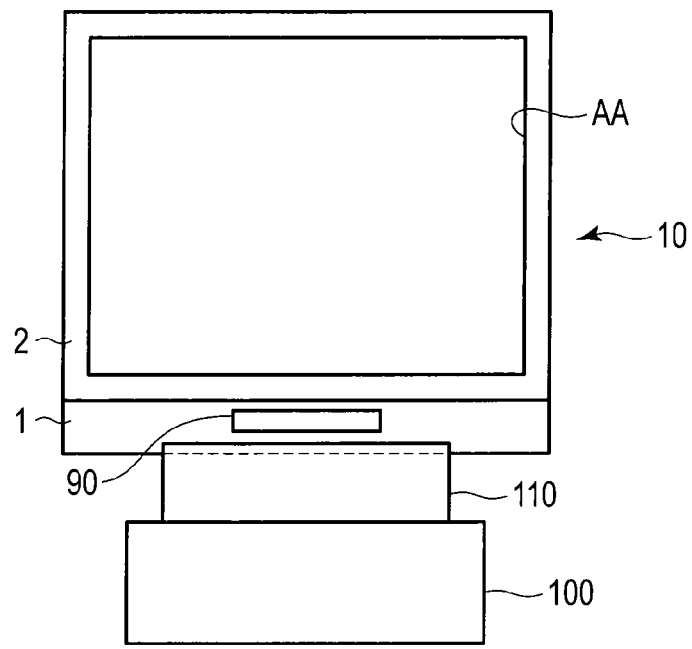
F I G. 1
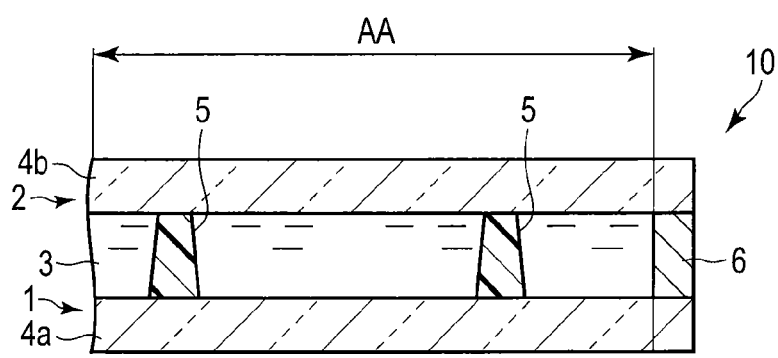
F I G. 2

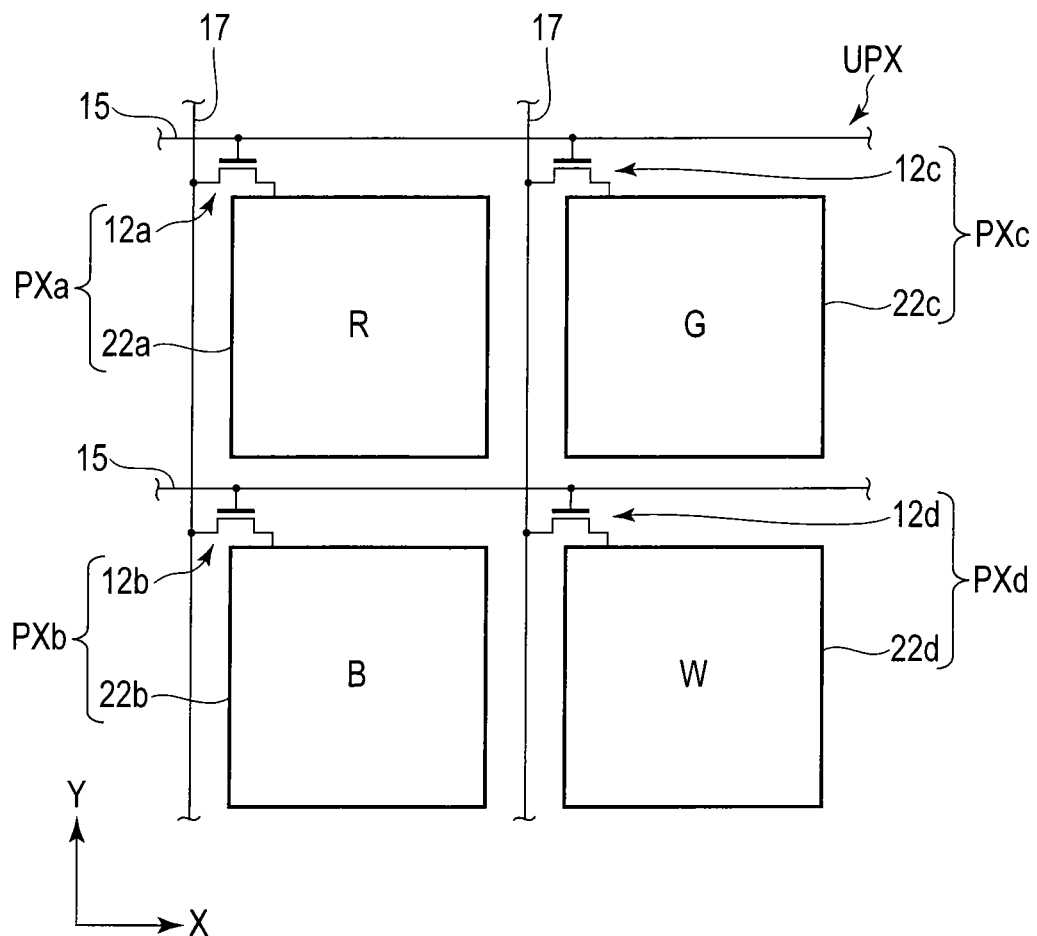
F I G. 4

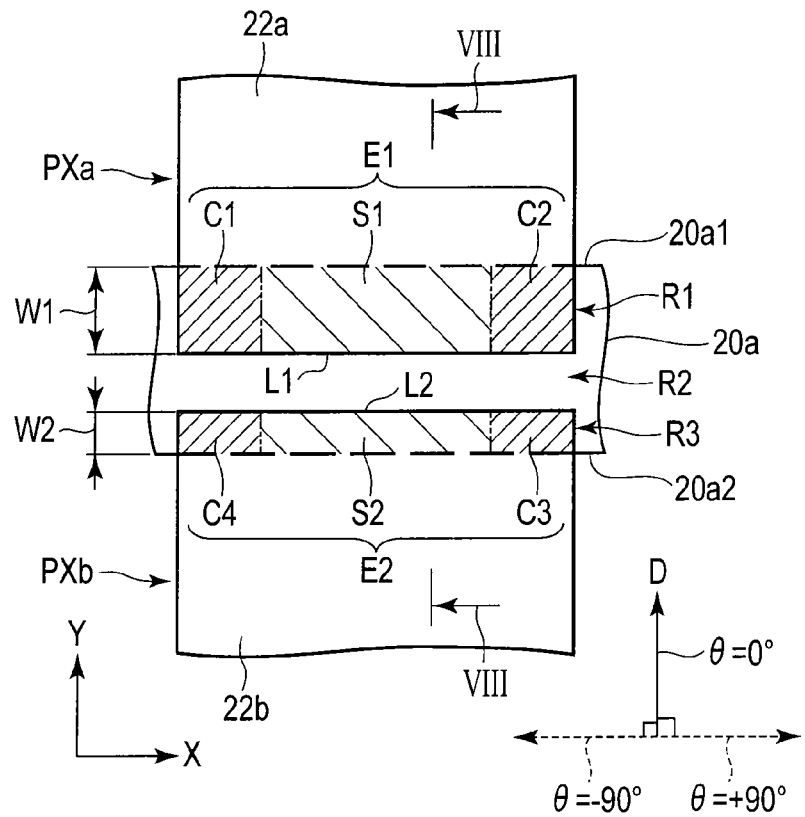
F I G. 7
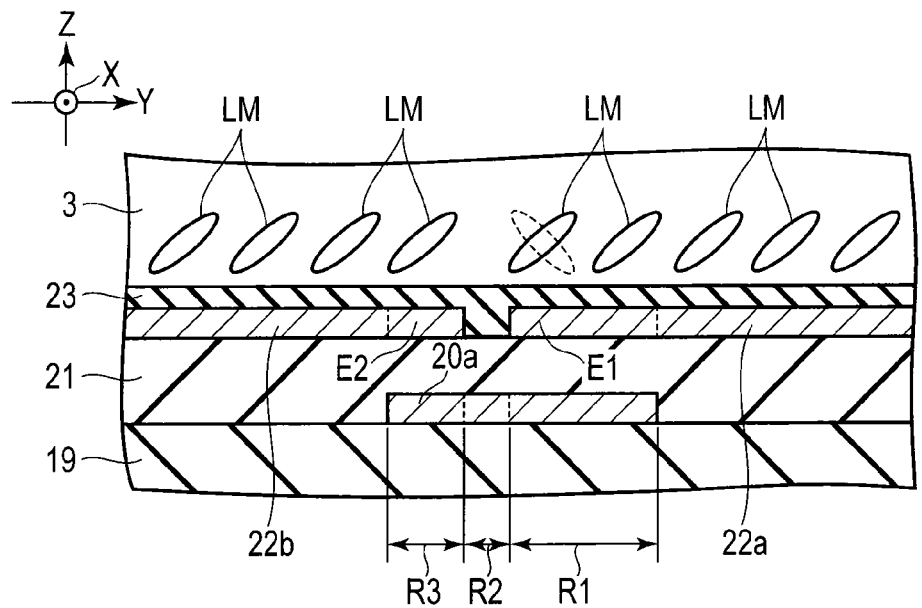
F I G. 8

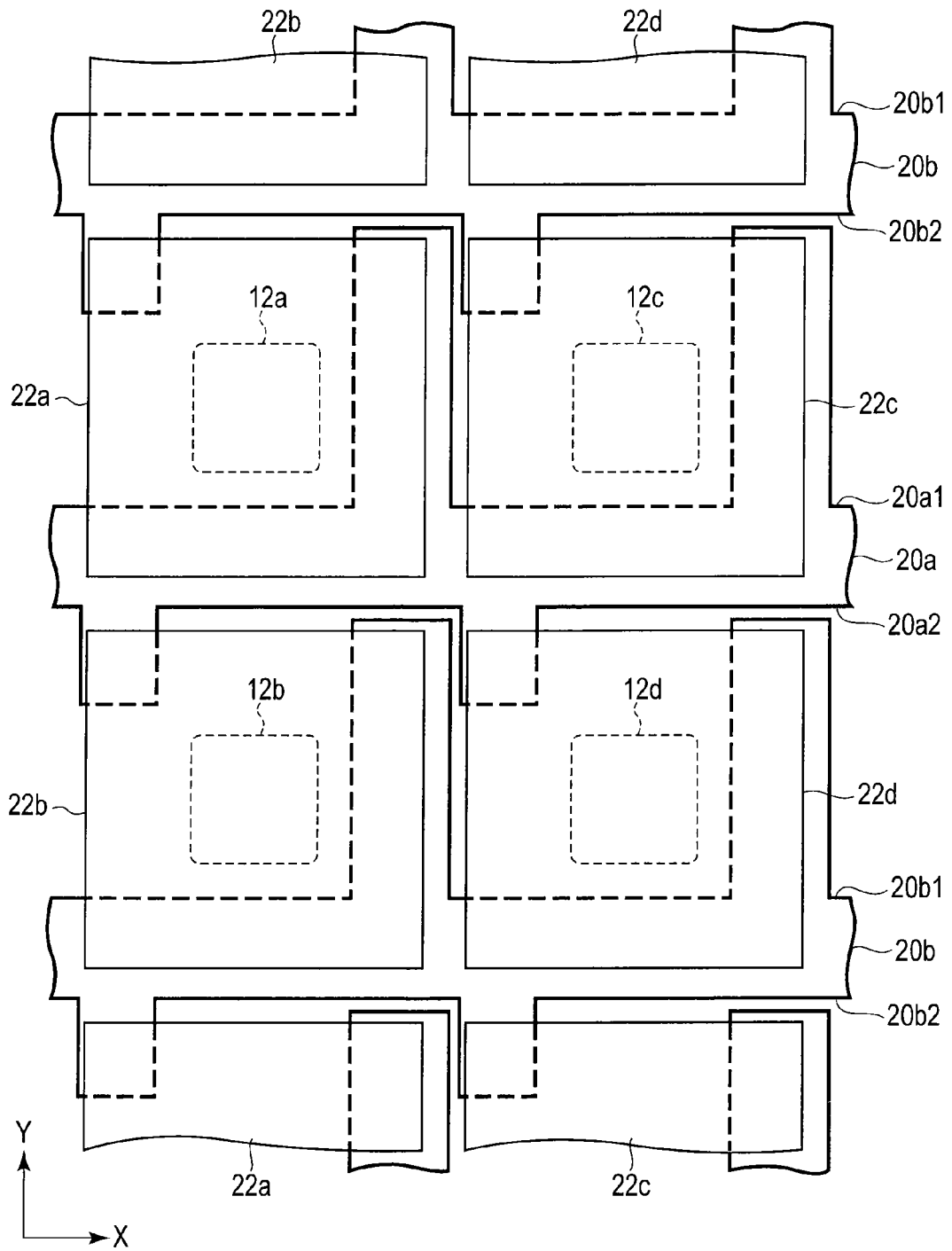
F I G. 10

LIQUID CRYSTAL DISPLAY DEVICE

CROSS-REFERENCE TO RELATED APPLICATIONS

This application is based upon and claims the benefit of priority from Japanese Patent Application No. 2014-104199, filed May 20, 2014, the entire contents of which are incorporated herein by reference.

FIELD

Embodiments described herein relate generally to a liquid crystal display device.

BACKGROUND

In general, a liquid crystal display device comprises an array substrate, a counter-substrate, a liquid crystal layer held between both the substrates, and a color filter formed in either one of the array substrate and the counter-substrate. A gap between the array substrate and the counter-substrate is uniformly held by spacers. As a display mode of the liquid crystal display device, various modes such as a twisted nematic (TN) mode are employed.

The array substrate and the counter-substrate comprise alignment films in contact with the liquid crystal layer, respectively. The alignment films are rubbed. Both the alignment films are capable of setting liquid crystal molecules to be in initial alignment.

BRIEF DESCRIPTION OF THE DRAWINGS

FIG. 1 is a schematically structural illustration of a liquid crystal display device of a first embodiment.

FIG. 2 is a schematically cross-sectional view showing a liquid crystal display panel shown in FIG. 1.

FIG. 4 is an equivalent circuit diagram showing a unit pixel shown in FIG. 3.

FIG. 7 is an enlarged plan view showing in part the schematic structure of the liquid crystal display panel, illustrating two pixel electrodes and one auxiliary electrode.

FIG. 8 is a cross-sectional view showing in part the liquid crystal display panel seen along line VIII-VIII in FIG. 7, illustrating an aligned state of a liquid crystal molecule.

FIG. 10 is a plan view showing a schematic structure of a liquid crystal display panel of a liquid crystal display device of a second embodiment, illustrating a plurality of pixel electrodes and a plurality of auxiliary electrodes.

DETAILED DESCRIPTION

Figure 3:
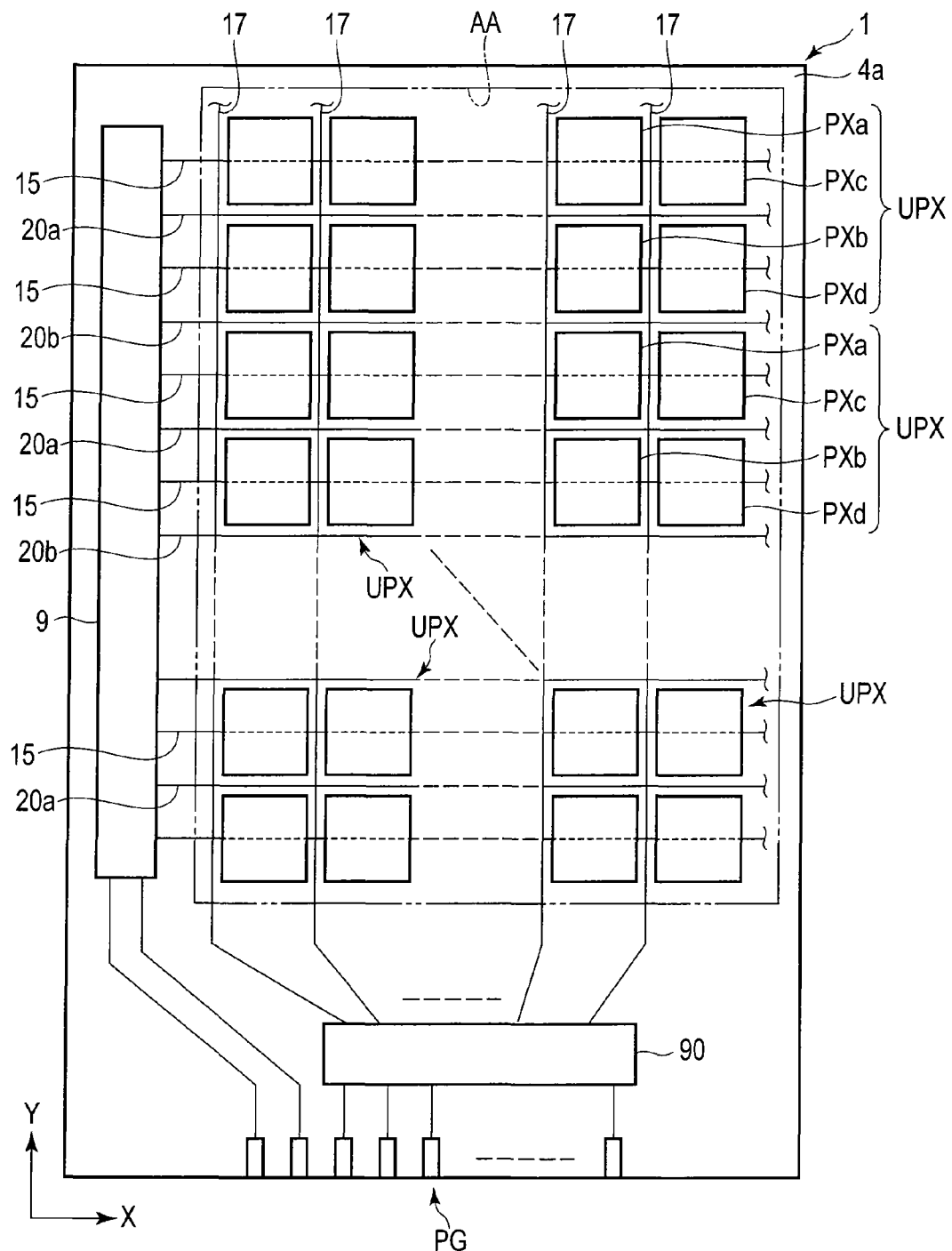
FIG. 3 is a plan view showing a schematic structure of an array substrate shown in FIG. 1 and FIG. 2.

In general, according to one embodiment, there is provided a liquid crystal display device comprising: a liquid crystal layer; a first pixel electrode which comprises a first corner portion, a second corner portion adjacent to the first corner portion, and a side edge portion located between the first corner portion and the second corner portion, and in which a first video signal is input; a second pixel electrode which is spaced apart from the first pixel electrode and adjacent to the first pixel electrode in a columnar direction, and in which a second video signal of polarity different from polarity of the first video signal is input; and an auxiliary electrode which is located over the first pixel electrode and the second pixel electrode from the liquid crystal layer, which includes a first region opposed to the first corner portion, the side edge portion and the second corner portion and a second region located between the first pixel electrode and the second pixel electrode in the columnar direction, and to which a voltage of the same polarity as the polarity of the first video signal is supplied.

According to another embodiment, there is provided a liquid crystal display device comprising: a liquid crystal layer; a first pixel electrode which comprises a first corner portion, a second corner portion adjacent to the first corner portion, a first side edge portion located between the first corner portion and the second corner portion, a third corner portion adjacent to the second corner portion, and a second side edge portion located between the second corner portion and the third corner portion, and in which a first video signal is input; a second pixel electrode which is spaced apart from the first pixel electrode and adjacent to the first pixel electrode in a columnar direction, and in which a second video signal of polarity different from polarity of the first video signal is input; and an auxiliary electrode which is located over the first pixel electrode and the second pixel electrode from the liquid crystal layer, which includes a first region opposed to the first corner portion, the first side edge portion, the second corner portion, the second side edge portion and the third corner portion, and a second region displaced from the first pixel electrode and the second pixel electrode, and to which a voltage of the same polarity as the polarity of the first video signal is supplied.

Embodiments of the present invention will be described hereinafter with reference to the accompanying drawings. The disclosure is merely an example, and proper changes within the spirit of the invention, which are easily conceivable by a skilled person, are included in the scope of the invention as a matter of course. In addition, in some cases, in order to make the description clearer, the widths, thicknesses, shapes, etc. of the respective parts are schematically illustrated in the drawings, compared to the actual modes. However, the schematic illustration is merely an example, and adds no restrictions to the interpretation of the invention. Besides, in the specification and drawings, the same elements as those described in connection with preceding drawings are denoted by like reference numerals, and a detailed description thereof is omitted unless otherwise necessary.

First, the basic concept of the embodiments is described.

A reflective type liquid crystal display device adopts, for example, a twisted nematic (TN) mode. The liquid crystal display device comprises an array substrate, a counter-substrate and a liquid crystal layer. The array substrate comprises a plurality of reflective type pixel electrodes, an alignment film, etc. For example, a first pixel electrode and a second pixel electrode of the pixel electrodes keep a space and are adjacent to each other in a columnar direction. The counter-substrate comprises a common electrode, an alignment film, etc. The alignment film of the array substrate is rubbed in the columnar direction. The alignment film of the counter-substrate is rubbed in a row direction. Both the alignment films can thereby set the liquid crystal molecules to be subjected to initial alignment.

In addition, the liquid crystal display device adopts the line-inversion drive scheme. For this reason, polarity of a video signal supplied to the pixel electrodes of the pixels in odd-numbered rows in one frame period and polarity of a video signal supplied to the pixel electrodes of the pixels in even-numbered rows in one frame period are different from each other. The polarity of the video signal supplied to each of the pixel electrodes is inverted every frame period.

However, if the liquid crystal display device adopts the line-inversion drive scheme as mentioned above, a problem arises that alignment defect of liquid crystal molecules called edge reverse occurs at the liquid crystal display device. The edge reverse indicates the alignment defect of liquid crystal molecules which occurs in an edge area opposed to an edge portion on an upstream side in the rubbing direction, of the pixel electrodes. Since display defect such as non-uniformity in luminance and persistence occurs at the edge area where the edge reverse occurs, quality of a display image may be deteriorated.

To suppress the deterioration in quality of the display image caused by the edge reverse, a manner of hiding the edge area can be adopted by forming a black matrix, etc., on the counter-substrate side to be wide. In this case, however, a light-shielding area may be extended due to the black matrix, etc., and a quantity of received outside light may be reduced remarkably by the black matrix, etc. For this reason, the luminance level of the display image may be reduced remarkably. In contrast, technology of reducing the occurrence of the edge reverse itself is developed. For example, the occurrence of the edge reverse can be suppressed by forming an auxiliary electrode between adjacent pixel electrodes. The auxiliary electrode is formed in a layer of the same level as the pixel electrodes and is located to be spaced apart from the pixel electrodes. In this case, however, the area occupied by the pixel electrodes may be reduced, i.e., an optically reflective area may be reduced. For this reason, the luminance level of the display image may be lowered similarly to the case of the means using the black matrix, etc.

Thus, in the present embodiments, a liquid crystal display device capable of suppressing the lowering of the image luminance level can be obtained by solving the above-mentioned problem. Alternatively, a liquid crystal display device excellent in display quality can be obtained. Next, means and methods for solving the problem will be explained.

A liquid crystal display device of a first embodiment will be hereinafter described in detail with reference to the accompanying drawings.

As shown in FIG. 1 and FIG. 2, the liquid crystal display device comprises a liquid crystal display panel 10. In the present embodiment, the liquid crystal display panel 10 adopts the TN mode. The liquid crystal display panel 10 comprises an array substrate 1, a counter-substrate 2 which is disposed opposite to the array substrate with a predetermined gap, and a liquid crystal layer 3 held between the substrates. Besides these, the liquid crystal display device comprises a signal line driving circuit 90 serving as a video signal output circuit, a controller 100, and a connector 110. As the connector 110, a flexible printed circuit (FPC) or a tape carrier package (TCP) can be used. The liquid crystal display panel 10 comprises a display area AA. The display area AA is surrounded by a non-display area.

As shown in FIG. 1 to FIG. 4, the array substrate 1 comprises, for example, a glass substrate 4a as a transparent insulation substrate. In the display area AA, a plurality of unit pixels UPX arrayed in a matrix are arranged on the glass substrate 4a. Number m of the unit pixels UPX are aligned in a row direction X and number n of the unit pixels UPX are aligned in a columnar direction Y perpendicular to the row direction X.

Each unit pixel UPX comprises a plurality of pixels PX. Here, each unit pixel UPX comprises first to fourth pixels PXa to PXd. The second pixel PXb is located to be adjacent to the first pixel PXa in the columnar direction Y. The third pixel PXc is located to be adjacent to the first pixel PXa in the row direction X. The fourth pixel PXd is located to be adjacent to the second pixel PXb in the row direction X and adjacent to the third pixel PXc in the columnar direction Y.

When not the unit of the unit pixels UPX, but the unit of the pixels PX is noticed, number 2×m of the pixels PX are aligned in the row direction X and number 2×n of the pixels PX are aligned in the columnar direction Y. In odd-numbered rows, the first pixels PXa and the third pixels PXc are alternately aligned in order. In even-numbered rows, the second pixels PXb and the fourth pixels PXd are alternately aligned in order. In odd-numbered columns, the first pixels PXa and the second pixels PXb are alternately aligned in order. In even-numbered columns, the third pixels PXc and the fourth pixels PXd are alternately aligned in order.

The unit pixels UPX may be restated as picture elements. Alternatively, the unit pixels UPX may be restated as pixels and, in this case, the pixels PX may be restated as sub-pixels.

A driving circuit 9 and an outer lead bonding pad group (hereinafter referred to as an OLB pad group) pG are formed above the glass substrate 4a, outside the display area AA. In the present embodiment, the driving circuit 9 is used as a scanning line driving circuit and auxiliary electrode driving circuit. The scanning line driving circuit and the auxiliary electrode driving circuit may be mounted separately from each other. In the non-display area shown in FIG. 3, for example, the scanning line driving circuit may be mounted in a left area and the auxiliary electrode driving circuit may be mounted in a right area.

In the display area AA, a plurality of (2×n) scanning lines 15 and a plurality of (2×m) signal lines 17 are provided above the glass substrate 4a. The signal lines 17 are connected to the signal line driving circuit 90. The signal lines 17 are extended in the columnar direction Y and spaced apart from each other in the row direction X. Each signal line 17 is electrically connected to a plurality of pixels PX of one columnar, which are arranged in the columnar direction Y. The scanning lines 15 are connected to the driving circuit 9 (scanning line driving circuit). The scanning lines 15 are extended in the row direction X and spaced apart from each other in the columnar direction Y. Each scanning line 15 is electrically connected to a plurality of pixels PX of one row, which are arranged in the row direction X.

Next, one of the unit pixels UPX will be explained.

As shown in FIG. 3 and FIG. 4, the first to fourth pixels PXa to PXd are the pixels configured to display images of different colors. In the present embodiment, the first to fourth pixels PXa to PXd are the pixels configured to display images of red color (R), green color (G), blue color (B) and white color (W). The unit pixel UPX is constituted by what is called RGBW square pixels (i.e., pixels formed by arraying four RGBW square pixels, in square).

The first pixel PXa comprises a first pixel electrode 22a and a first switching element 12a, and is formed to display a red (R) image. In the present embodiment, the first switching element 12a is a thin-film transistor (TFT). The first switching element 12a comprises a first electrode electrically connected to the scanning line 15, a second electrode electrically connected to the signal line 17, and a third electrode electrically connected to the first pixel electrode 22a.

In the first switching element 12a, the first electrode functions as a gate electrode, either of the second electrode and the third electrode functions as a source electrode, and the other of the second electrode and the third electrode functions as a drain electrode. Functions of the first to third electrodes are the same as those in second to fourth switching elements 12b to 12d to be explained later.

The second pixel PXb comprises a second pixel electrode 22b and a second switching element 12b, and is configured to display a blue (B) image. In the present embodiment, the second switching element 12b is a TFT. The second switching element 12b comprises a first electrode electrically connected to the scanning line 15, a second electrode electrically connected to the signal line 17, and a third electrode electrically connected to the second pixel electrode 22b. The second pixel PXb is connected to the same signal line 17 with the first pixel PXa.

The third pixel PXc comprises a third pixel electrode 22c and a third switching element 12c, and is configured to display a green (G) image. In the present embodiment, the third switching element 12c is a TFT. The third switching element 12c comprises a first electrode electrically connected to the scanning line 15, a second electrode electrically connected to the signal line 17, and a third electrode electrically connected to the third pixel electrode 22c. The third pixel PXc is connected to the same scanning line 15 with the first pixel PXa.

The fourth pixel PXd comprises a fourth pixel electrode 22d and a fourth switching element 12d, and is configured to display a white (W) image. In the present embodiment, the fourth switching element 12d is a TFT. The fourth switching element 12d comprises a first electrode electrically connected to the scanning line 15, a second electrode electrically connected to the signal line 17, and a third electrode electrically connected to the fourth pixel electrode 22d. The fourth pixel PXd is connected to the same scanning line 15 with the second pixel PXb. The fourth pixel PXd is connected to the same signal line 17 with the third pixel PXc.

In the present embodiment, as explained above, two signal lines 17 and two scanning lines 15 are connected to each unit pixel UPX. However, four signal lines 17 and one scanning line 15 may be connected to each unit pixel UPX. In this case, the first to fourth pixels PXa to PXd of the unit pixel UPX are electrically connected to the same scanning line 15. The first to fourth pixels PXa to PXd of the unit pixel UPX are electrically connected to the different signal lines 17.

Figure 5:
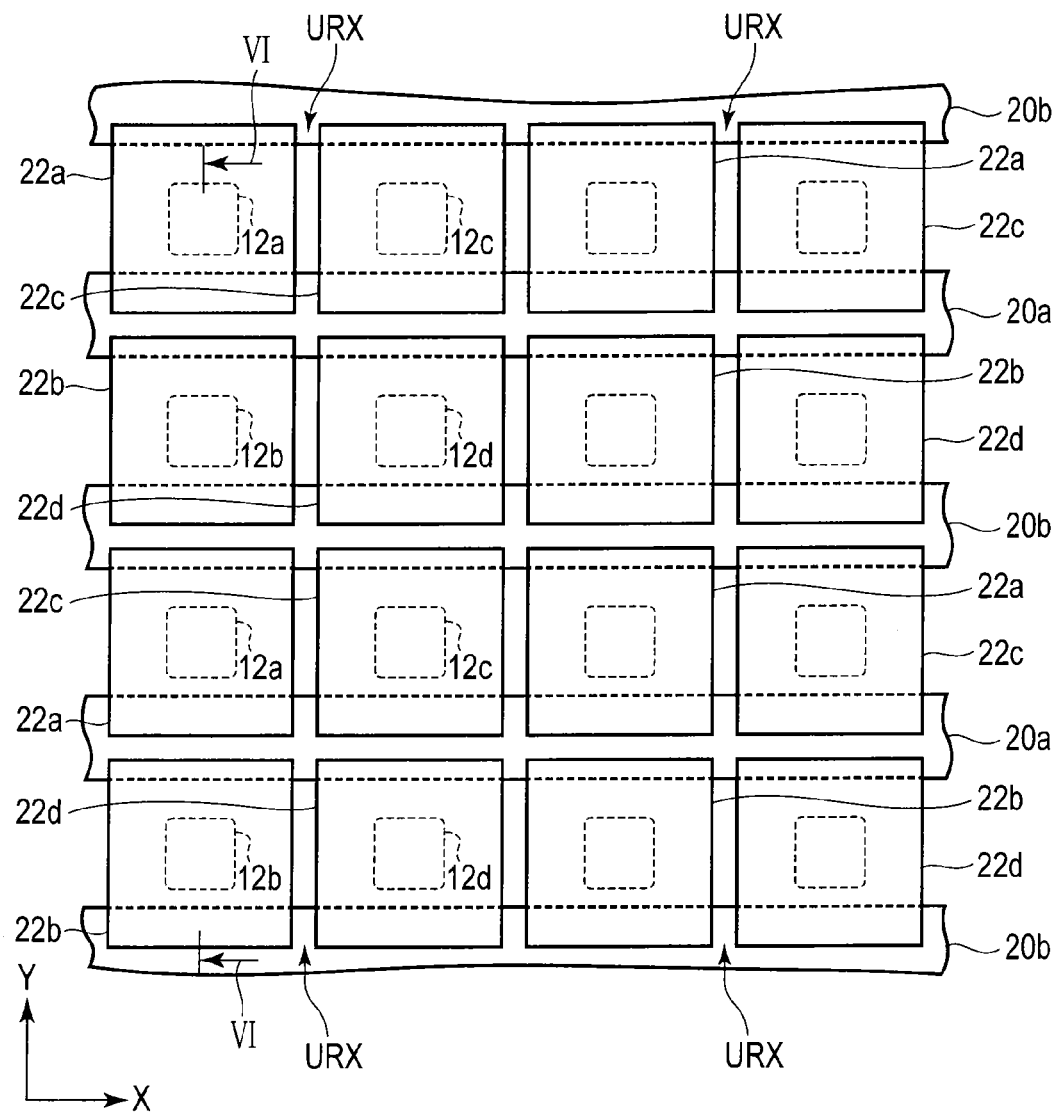
FIG. 5 is a plan view showing a schematic structure of the liquid crystal display panel, illustrating a plurality of pixel electrodes of four unit pixels and a plurality of auxiliary electrodes.

As shown in FIG. 3 and FIG. 5, furthermore, a plurality of (2n−1) auxiliary electrodes 20 are arranged above the glass substrate 4a, in the display area AA. The auxiliary electrodes 20 are connected to the driving circuit 9 (auxiliary electrode driving circuit). The auxiliary electrodes 20 are extended in the row direction X and spaced apart from each other in the columnar direction Y. The auxiliary electrodes 20 are generally located between the pixels PX adjacent in the columnar direction Y.

The auxiliary electrodes 20 are classified into first auxiliary electrodes 20a and second auxiliary electrodes 20b. The first auxiliary electrodes 20a and the second auxiliary electrodes 20b are arrayed alternately and sequentially in the columnar direction Y. The pixel electrodes which are closest to the first auxiliary electrode 20a in the columnar direction Y are the first pixel electrodes 22a and the third pixel electrodes 22c on a front side, and the second pixel electrodes 22b and the fourth pixel electrodes 22d on a rear side. The pixel electrodes which are closest to the second auxiliary electrode 20b in the columnar direction Y are the second pixel electrodes 22b and the fourth pixel electrodes 22d on a front side, and the first pixel electrodes 22a and the third pixel electrodes 22c on a rear side.

Next, a cross-sectional structure of the liquid crystal display panel 10 will be explained.

Figure 6:
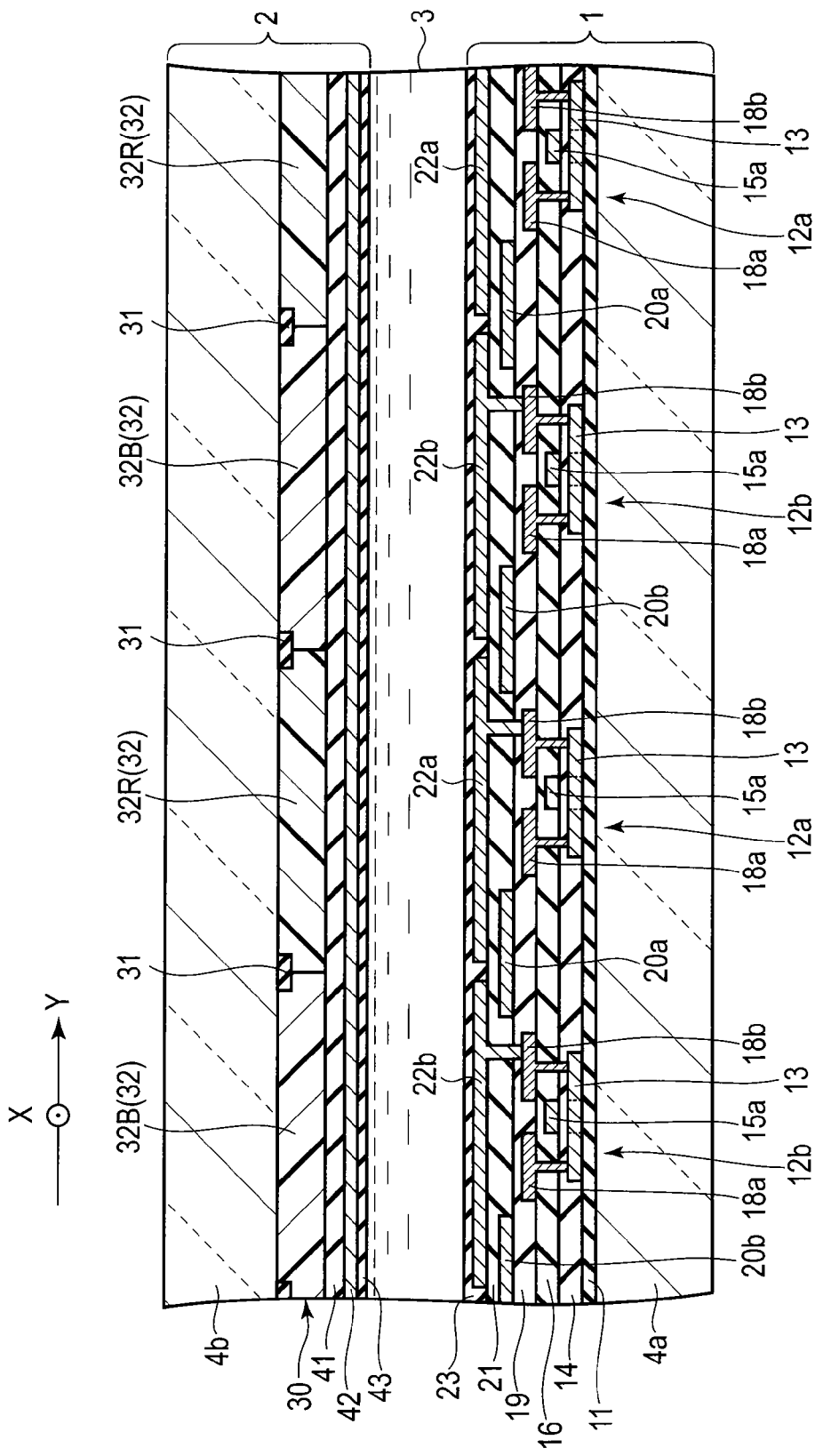
FIG. 6 is a cross-sectional view showing the liquid crystal display panel shown in FIG. 5 seen along line VI-VI.

As shown in FIG. 5 and FIG. 6, an undercoat film (insulating film) 11 is formed on the glass substrate 4a. A plurality of switching elements 12 (12a to 12d) are formed above the undercoat film 11.

More specifically, a semiconductor layer 13 is formed on the undercoat film 11. A gate insulating film 14 is formed on the undercoat film 11 and the semiconductor layer 13. A plurality of scanning lines 15 are formed on the gate insulating film 14. The scanning lines 15 includes a plurality of first electrodes (gate electrodes) 15a opposed to first regions (channel regions) of the semiconductor layer 13. A first interlayer insulating film 16 is formed on the gate insulating film 14 and the scanning lines 15 (first electrodes 15a).

The signal lines 17, a plurality of second electrodes 18a and a plurality of third electrodes 18b are formed on the first interlayer insulating film 16. The signal lines 17, the second electrodes 18a and the third electrodes 18b are formed of the same material, simultaneously. The signal lines 17 are formed integrally with the second electrodes 18a. Each second electrode 18a is in contact with second region of the semiconductor layer 13 through contact hole formed in the gate insulating film 14 and the first interlayer insulating film 16. Each drain electrode 18b is in contact with third region of the semiconductor layer 13 through other contact hole formed in the gate insulating film 14 and the first interlayer insulating film 16. Either of the second region and the third region functions as a source region while the other of the second region and the third region functions as a drain region. The switching element 12 is formed as described above.

A second interlayer insulating film 19 is formed on the first interlayer insulating film 16, the signal lines 17, the second electrodes 18a and the third electrodes 18b. The auxiliary electrodes 20 (20a and 20b) are formed on the second interlayer insulating film 19. In the present embodiment, the auxiliary electrodes 20 are formed of a conductive material, for example, a metal. The auxiliary electrodes 20 can also be formed of a transparent conductive material such as indium tin oxide (ITO), indium zinc oxide (IZO), etc.

An insulating film 21 is formed on the second interlayer insulating film 19 and the auxiliary electrodes 20. The insulating film 21 may also function as a planarization film. The insulating film 21 has a function of reducing bumps and dips on the surface of the array substrate 1 by functioning as a planarization film.

A plurality of pixel electrodes 22 (22a to 22d) are formed on the insulating film 21. In the present embodiment, each of the pixel electrodes 22 is formed of a light-reflecting conductive layer, a transparent conductive layer or a laminate thereof. The light-reflecting conductive layer can be formed of a metal material of aluminum (Al) or the like. The transparent conductive layer can be formed of a transparent conductive material such as ITO, IZO, etc. In the present embodiment, the pixel electrode 22 is a light-reflective type pixel electrode formed of a laminate of the light-reflecting conductive layer and the transparent conductive layer. The liquid crystal display panel 10 is a light-reflective type liquid crystal display panel. The pixel electrode 22 has a light-reflecting property, and can reflect light made incident from the side of the display surface (outer surface of the counter-substrate 2) to the display surface side.

For example, the transparent conductive layer is located at a top of the pixel electrode 22. The transparent conductive layer may be the same in size as the light-reflecting conductive layer and may be formed to completely overlap the light-reflecting conductive layer. In this case, by patterning a laminated light-reflecting conductive film and a transparent conductive film which are laminated, in the one-time photolithographic process, the light-reflecting conductive layer and the transparent conductive layer can be formed simultaneously.

The liquid crystal display panel 10 may be a light-transmissive type liquid crystal display panel. In this case, the pixel electrode 22 may be a light-transmissive type pixel electrode formed of the transparent conductive layer alone. The pixel electrode 22 may have a light-transmitting property, and may be capable of emitting light made incident from the array substrate 1 side to the counter-substrate 2 side.

Columnar spacers 5 (FIG. 2) are formed on the insulating film 21 and the pixel electrodes 22. An alignment film 23 is formed on the insulating film 21, the pixel electrodes 22 and the columnar spacers 5. The alignment film 23 is in contact with the liquid crystal layer 3. In the present embodiment, the alignment film 23 is a horizontal alignment film and is subjected to an alignment treatment such as rubbing.

The alignment film 23 can thereby set the liquid crystal molecules of the liquid crystal layer 3 to be subjected to initial alignment.

The array substrate 1 is formed as described above.

As shown in FIG. 6, the counter-substrate 2 comprises, for example, a glass substrate 4b as the transparent insulating substrate. A color filter 30 is formed on the glass substrate 4b. The color filter 30 includes a black matrix 31 and a plurality of colored layers (or uncolored layers) 32. The black matrix 31 is formed in a lattice shape so as to partition a plurality of pixels PX.

In the present embodiment, the color filter 30 comprises a red-colored layer 32 (32R) forming a first pixel PXa, a blue-colored layer 32 (32B) forming a second pixel PXb, a green-colored layer 32 forming a third pixel PXc, and a transparent uncolored layer 32 forming a fourth pixel PXd. The color filter 30 can be formed without the uncolored layer 32.

In addition, in the present embodiment, an overcoat film 41 is formed on the color filter 30. The overcoat film 41 has a function of reducing bumps and dips on the surface of the counter-substrate 2. The overcoat film 41 may be formed as needed. A counter-electrode (common electrode) 42 and an alignment film 43 are formed in order on the overcoat film 41.

In the present embodiment, the counter-electrode 42 is formed of a transparent conductive material such as ITO, IZO, etc. The alignment film 43 is in contact with the liquid crystal layer 3. The alignment film 43 is a horizontal alignment film and is subjected to an alignment treatment such as rubbing. The alignment film 23 can thereby set the liquid crystal molecules of the liquid crystal layer 3 to be subjected to initial alignment.

The counter-substrate 2 is formed as described above.

As shown in FIG. 2, the gap formed between the array substrate 1 and the counter-substrate 2 is held by the columnar spacers 5. The array substrate 1 and the counter-substrate 2 are bonded to each other by a sealing member 6 arranged at peripheral portions of the substrates. The liquid crystal layer 3 is formed in a space surrounded by the array substrate 1, the counter-substrate 2 and the sealing member 6. In the present embodiment, the liquid crystal layer 3 is formed of a positive liquid crystal material.

The liquid crystal display device is formed as described above.

Next, a relationship between a pair of pixel electrodes 22 adjacent in the columnar direction Y and one auxiliary electrode 20 located between the pixel electrodes will be explained. The first pixel electrode 22a, the second pixel electrode 22b and the first auxiliary electrode 20a will be explained here as representative electrodes.

As shown in FIG. 7 and FIG. 8, the first pixel electrode 22a is formed in, for example, a rectangular shape and includes sides extending in the row direction X and sides extending in the columnar direction Y. In the present embodiment, the first pixel electrode 22a is shaped in a square. The first pixel electrode 22a includes a first corner portion C1, a second corner portion C2 adjacent to the first corner portion C1, and a side edge portion S1 located between the first corner portion C1 and the second corner portion C2. For example, each of the first corner portion C1, the second corner portion C2 and the side edge portion S1 is formed in a rectangular shape. The first corner portion C1, the second corner portion C2 and the side edge portion S1 form a lower end portion E1 of the first pixel electrode 22a. The first pixel electrode 22a includes a lower side L1 as one of the sides extending in the row direction X that defines the first corner portion C1, the side edge portion S1 and the second corner portion C2.

A plurality of pixels PX (PXa and PXc) aligned in the row direction X including the first pixel PXa form a first pixel group. Each of the pixels PX (PXa and PXc) of the first pixel group includes the lower end portion E1, etc., and also includes pixel electrodes 22 (22a and 22c) formed similarly to the first pixel electrode 22a.

The second pixel electrode 22b is spaced apart from the first pixel electrode 22a and is adjacent to the first pixel electrode 22a in the columnar direction Y. The second pixel electrode 22b is formed in, for example, a rectangular shape and includes sides extending in the row direction X and sides extending in the columnar direction Y. In the present embodiment, the second pixel electrode 22b is shaped in a square. The second pixel electrode 22b includes a third corner portion C3 opposed to the second corner portion C2, a fourth corner portion C4 opposed to the first corner portion C1, and a side edge portion S2 located between the third corner portion C3 and the fourth corner portion C4. For example, each of the third corner portion C3, the fourth corner portion C4 and the side edge portion S2 is formed in a rectangular shape. The third corner portion C3, the fourth corner portion C4 and the side edge portion S2 form an upper end portion E2 of the second pixel electrode 22b. The second pixel electrode 22b includes an upper side L2 as one of the sides extending in the row direction X that defines the third corner portion C3, the side edge portion S2 and the fourth corner portion C4. The upper side L2 is opposed to the lower side L1.

A plurality of pixels PX (PXb and PXd) aligned in the row direction X including the second pixel PXb form a second pixel group. The second pixel group is adjacent to the first pixel group in the columnar direction Y. Each of the pixels PX (PXb and PXd) of the second pixel group includes the upper end portion E2, etc., and also includes pixel electrodes 22 (22b and 22d) formed similarly to the second pixel electrode 22b.

The first auxiliary electrode 20a is located over the first pixel electrode 22a and the second pixel electrode 22b from the liquid crystal layer 3. The first auxiliary electrode 20a is extended in the row direction X and is formed in a band shape. The first auxiliary electrode 20a includes a first side edge 20a1 and a second side edge 20a2. The first side edge 20a1 is opposed to the first pixel electrode 22a in a thickness direction Z. The second side edge 20a2 is opposed to the second pixel electrode 22b in the thickness direction Z. The thickness direction Z is a thickness direction of the liquid crystal display panel 10, and lies from the array substrate 1 side toward the counter-substrate 2 side so as to be perpendicular to the row direction X and the columnar direction Y.

The first auxiliary electrode 20a includes first to third regions R1 to R3. The first region R1 is opposed to the lower end portion E1 of the first pixel electrode 22a. The second region R2 is located between the first pixel electrode 22a and the second pixel electrode 22b in the columnar direction Y. The third region R3 is opposed to the upper end portion E2 of the second pixel electrode 22b.

In the present embodiment, the first region R1 is larger than the third region R3. A width W1 in the columnar direction Y of the first region R1 is greater than a width W2 in the columnar direction Y of the third region R3.

Each of the first auxiliary electrodes 20a includes a plurality of first regions R1 opposed to the lower end portions E1 of the pixel electrodes 22 (22a and 22c) of the pixels PX (PXa and PXc) in the first pixel group. Each of the first auxiliary electrodes 20a includes a plurality of third regions R3 opposed to the upper end portions E2 of the pixel electrodes 22 (22b and 22d) of the plurality of pixels PX (PXb and PXd) in the second pixel group. The second regions R2 of each of the first auxiliary electrodes 20a are located between the pixel electrodes 22 (22a and 22c) of the plurality of pixels PX in the first pixel group and the pixel electrodes 22 (22b and 22d) of the plurality of pixels PX in the second pixel group, in the columnar direction Y.

Next, the alignment treatment executed for the alignment film will be explained.

As shown in FIG. 7 and FIG. 8, the alignment film 23 is located between the pixel electrodes 22 (22a to 22d) and the liquid crystal layer 3 and is in contact with the liquid crystal layer 3. In the present embodiment, the alignment film 23 is rubbed in the columnar direction Y.

However, the direction of rubbing the alignment film 23 is not limited to the columnar direction Y, but can be variously modified in an X-Y plane. The alignment film 23 may be rubbed in any one of directions within a range of ±90° (−90°≤θ≤+90° to the columnar direction Y. The angle θ in the columnar direction Y is set to be zero in a state in which the liquid crystal display panel 10 is viewed in a plane. The state in which the liquid crystal display panel 10 is viewed in a plane indicates a state in which the liquid crystal display panel 10 is viewed from a direction opposite to the thickness direction Z. As regards the angle θ in the state in which the liquid crystal display panel 10 is viewed in a plane, an angle clockwise in the columnar direction Y is set to be a plus angle and an angle counterclockwise in the columnar direction Y is set to be a minus angle.

In contrast, the alignment film 43 (FIG. 6) is also rubbed. In the present embodiment, the liquid crystal display panel 10 adopts the TN mode as explained above. For this reason, the alignment film 43 is rubbed in a direction substantially perpendicular to the direction of rubbing the alignment film 23.

Next, a method of driving the liquid crystal display panel 10 will be explained.

As shown in FIG. 3 and FIG. 5, the liquid crystal display device of the present embodiment adopts the line-inversion drive scheme. The line-inversion drive scheme is also called a gate line-inversion drive scheme or lateral column-inversion drive scheme. For this reason, polarity of a first video signal supplied to the pixel electrodes 22 (22a and 22c) of the pixels PX (PXa and PXc) in odd-numbered rows is different from polarity of a second video signal supplied to the pixel electrodes 22 (22b and 22d) of the pixels PX (PXb and PXd) in even-numbered rows in one frame period. The polarity of the first video signal input to each of the pixel electrodes 22 (22a and 22c) and the polarity of the second video signal input to each of the pixel electrodes 22 (22b and 22d) are inverted every frame period. The video signals are input from the signal line driving circuit 90 to the pixel electrodes 22 via the signal lines 17 and the switching elements 12.

A voltage of the same polarity as the polarity of the first video signal is supplied to the first auxiliary electrode 20a every frame period. A voltage of the same polarity as the polarity of the second video signal is supplied to the second auxiliary electrode 20b every frame period. The voltages are supplied from the driving circuit 9 to the first auxiliary electrode 20a and the second auxiliary electrode 20b.

In addition, a common voltage is supplied to the counter-electrode 42.

The pixel electrodes 22 and the counter-electrode 42 are set to supply no electric field in a state in which no voltage is applied to the liquid crystal layer 3, i.e., a state in which no voltage is applied between the pixel electrodes 22 and the counter-electrode 42. As shown in FIG. 8, in a state in which no voltage is applied, liquid crystal molecules LM are influenced by an alignment restriction force of the alignment films 23 and 43 and are subjected to initial alignment.

In contrast, the pixel electrodes 22 and the counter-electrode 42 are set to supply an electric field in a state in which the voltage is applied to the liquid crystal layer 3, i.e., a state in which the voltage is applied between the pixel electrodes 22 and the counter-electrode 42. Directors of the liquid crystal molecules LM are aligned along electric lines of force, in the voltage-applied state.

Unlike the present embodiment, the auxiliary electrodes 20 (20a and 20b) often are not provided, or a voltage of a predetermined polarity often is not applied to the auxiliary electrodes 20, the directors of the liquid crystal molecules LM in areas close to the lower end portion E1 are often aligned along lateral electric lines of force extending from the pixel electrodes 22a (22c) to the pixel electrodes 22b (22d) or from the pixel electrodes 22b (22d) to the pixel electrodes 22a (22c). For example, the liquid crystal molecules LM are consequently aligned so as to be inclined to a side opposite to that in the initial alignment state, similarly to a liquid crystal molecule LM represented by a dashed line in FIG. 8. In other words, occurrence of the edge reverse is caused in an area close to the lower end portion E1.

Thus, in the present embodiment, the auxiliary electrodes 20 (20a and 20b) are provided and the voltage of a predetermined polarity is supplied to the auxiliary electrodes 20, as explained above. The electric lines of force can hardly be extended from the pixel electrodes 22a (22c) to the pixel electrodes 22b (22d) or from the pixel electrodes 22b (22d) to the pixel electrodes 22a (22c). For this reason, even if the liquid crystal display device adopts the line-inversion drive scheme, the occurrence of the edge reverse in an area opposed to the lower end portion E1 can be avoided effectively. In this case, electric lines of force extend between the pixel electrode 22b and the auxiliary electrode 20a in the area close to the upper end portion E2, but the direction of the initial alignment substantially matches the direction of the electric lines of force in this area and the occurrence of the edge reverse does not need to be worried.

The liquid crystal display device of the first embodiment constructed as described above comprises the liquid crystal layer 3, the first to fourth pixel electrodes 22a to 22d, and the first and second auxiliary electrodes 20a and 20b. For example, the second pixel electrode 22b is spaced apart from the first pixel electrode 22a and is adjacent to the first pixel electrode 22a in the columnar direction Y. The first auxiliary electrode 20a includes the first region R1 and the second region R2. In one arbitrary frame period, the first video signal is input to the first pixel electrode 22a, the second video signal of the polarity different from the polarity of the first video signal is input to the second pixel electrode 22b, and the voltage of the same polarity as the polarity of the first video signal is supplied to the first auxiliary electrode 20a. Since the occurrence of the edge reverse can be thereby avoided effectively, the liquid crystal display device excellent in display quality can be obtained.

To prevent the deterioration in display quality, the black matrix 31, etc., do not need to be wide as explained above. Reduction of quantity of the received outside light caused by the black matrix, etc. can be prevented. For this reason, the liquid crystal display device capable of suppressing the lowering of the image luminance level can be obtained.

The auxiliary electrodes 20 and the pixel electrodes 22 are not arranged to be aligned along the X-Y plane (plane arrangement), but arranged to be opposed in the thickness direction Z (laminating arrangement). Since reduction of the area occupied by the pixel electrodes 22 can be avoided, lowering of the image luminance level can be suppressed.

The alignment film 23 may be rubbed in any one of directions within a range of ±90° (−90°≤θ≤+90°) to the columnar direction Y. In this case, too, occurrence of the edge reverse can be reduced. A rubbing direction D greatly affects the viewing angle of the liquid crystal display panel 10 but, due to the above-explained matter, restrictions of selection range of the rubbing direction D are removed or reduced. For this reason, an effect of greatly increasing the degree of freedom of the liquid crystal display panel 10 can be obtained.

Since the third region R3 of each auxiliary electrode 20 and the upper end portion E2 of each pixel electrode 22 are set to have opposite polarities, they can be used as storage capacitor.

For example, a facing area of the first region R1 of the first auxiliary electrode 20a and the lower end portion E1 of the first pixel electrode 22a is larger than a facing area of the third region R3 of the first auxiliary electrode 20a and the upper end portion E2 of the second pixel electrode 22b. However, the first auxiliary electrode 20a and the first pixel electrode 22a are set to have the same polarity. For this reason, the first region R1 and the lower end portion E1 can hardly form a parasitic capacitance.

Based on the above, the liquid crystal display device capable of suppressing the lowering of the image luminance level can be obtained. Alternatively, the liquid crystal display device excellent in the display quality can be obtained.

Next, a liquid crystal display device of a modified example 1 of the first embodiment will be described. The liquid crystal display device of the modified example 1 is formed in the same manner as the liquid crystal display device of the first embodiment except the auxiliary electrodes 20 (20a and 20b). In the modified example 1, a positional relationship between the pixel electrodes 22 (22a and 22b) and the auxiliary electrode 20 (20a) will be explained.

Figure 9:
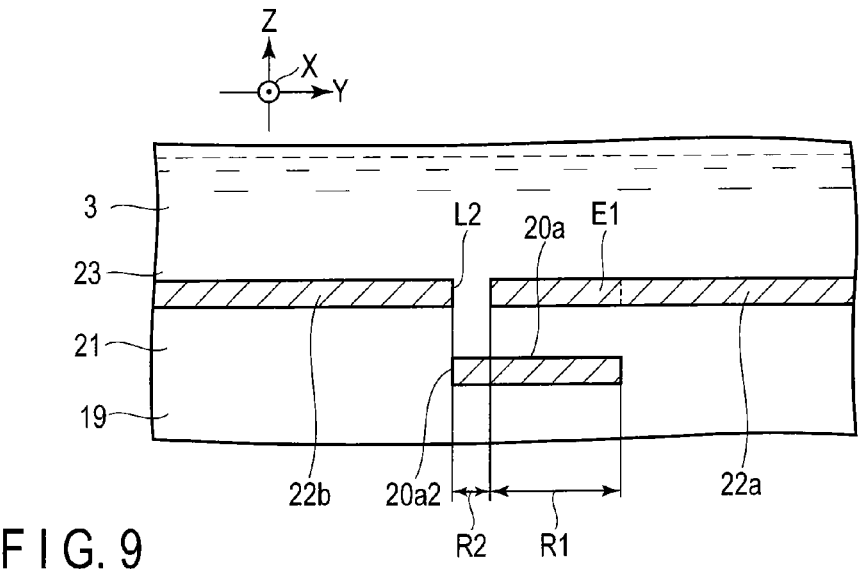
FIG. 9 is a cross-sectional view showing in part the liquid crystal display panel of the liquid crystal display device of a modified example 1 according to the first embodiment, for explanation of a positional relationship between two pixel electrodes and one auxiliary electrode.

As shown in FIG. 9, the auxiliary electrode 20 may not include the above-explained third regions R3. For example, the first auxiliary electrode 20a may include the second side edge 20a2 located in the same plane as the upper side L2 of the second pixel electrode 22b. The same plane is parallel to the X-Z plane defined by the row direction X and the thickness direction Z.

Even if the auxiliary electrodes 20 do not include the above-explained third region R3, similarly to the modified example 1, the same advantage as that of the first embodiment can be obtained. For example, occurrence of the edge reverse can be reduced. If the first auxiliary electrodes 20 include the first region R1 and the second region R2, the effect of reducing the occurrence of the edge reverse can be obtained. For this reason, even if the second side edge 20a2 and the upper side L2 forms a gap in the columnar direction Y, the effect of reducing the occurrence of the edge reverse can be obtained. However, as the gap in the columnar direction Y between the second side edge 20a2 and the upper side L2 becomes greater, the effect of reducing the occurrence of the edge reverse is smaller. For this reason, an aspect of forming the gap in the columnar direction Y between the second side edge 20a2 and the upper side L2 is not much preferable.

Next, a liquid crystal display device of a second embodiment will be described in detail. The liquid crystal display device of the present embodiment is formed in the same manner as the liquid crystal display device of the first embodiment except the shape of the auxiliary electrodes 20 and the rubbing direction D.

As shown in FIG. 10, The auxiliary electrodes 20 (20a and 20b) are formed to be substantially extended in the row direction X and have an irregular structure. The auxiliary electrode 20 comprises band portion extending in the row direction X, a plurality of first protruding portions which protrude from second side edge (20a2 or 20b2) of the band portion in a direction opposite to the columnar direction Y, and a plurality of second protruding portions which protrude from first side edge (20a1 or 20b1) of the band portion in the columnar direction Y. In the present embodiment, too, the first auxiliary electrodes 20a and the second auxiliary electrodes 20b are electrically insulated from each other.

Next, a relationship between a pair of pixel electrodes 22 adjacent in the columnar direction Y and one auxiliary electrode 20 located between the pixel electrodes will be explained. The first pixel electrode 22a, the second pixel electrode 22b and the first auxiliary electrode 20a will be explained here as representative electrodes.

Figure 11:
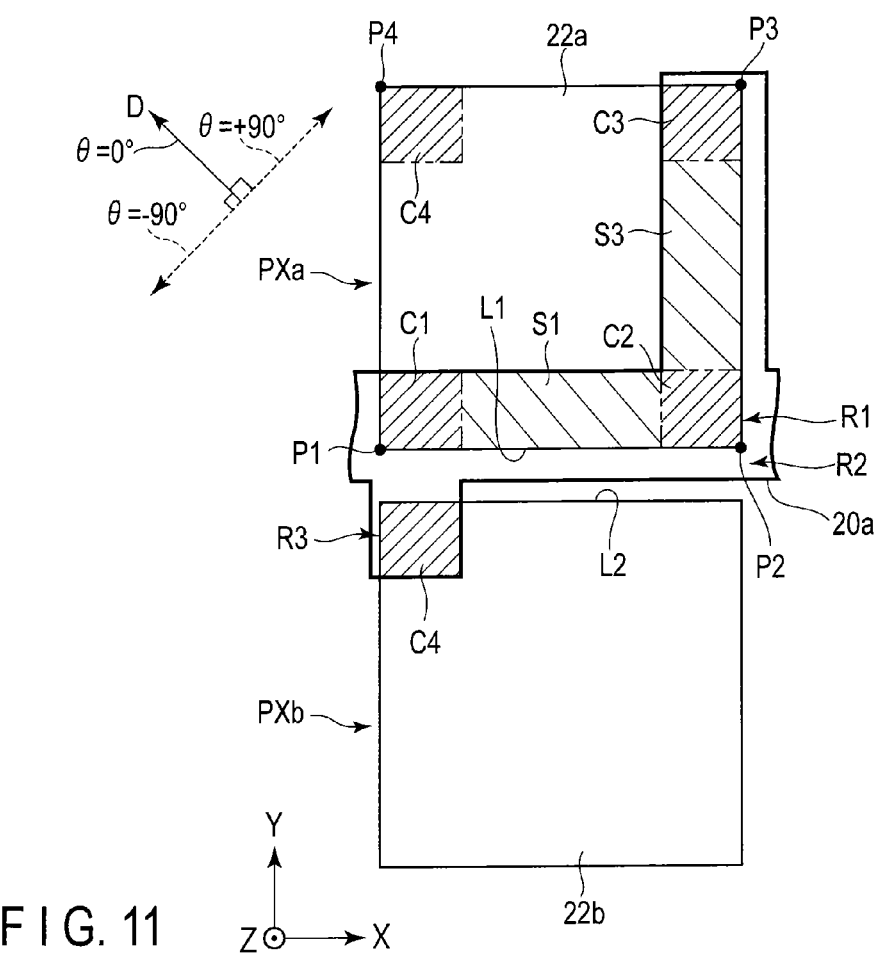
FIG. 11 is an enlarged plan view showing in part the schematic structure of the liquid crystal display panel shown in FIG. 10, illustrating two pixel electrodes and one auxiliary electrode.

As shown in FIG. 10 and FIG. 11, the first pixel electrode 22a is formed in, for example, a rectangular shape and includes sides extending in the row direction X and sides extending in the columnar direction Y. In the present embodiment, the first pixel electrode 22a is shaped in a square. The first pixel electrode 22a includes a first corner portion C1, a second corner portion C2 adjacent to the first corner portion C1, a side edge portion S1 located between the first corner portion C1 and the second corner portion C2, a third corner portion C3 adjacent to the second corner portion C2, a side edge portion S3 located between the second corner portion C2 and the third corner portion C3, and a fourth corner portion C4 different from the first to third corner portions C1 to C3. In the present embodiment, the side edge portion S1 functions as a first side edge portion and the side edge portion S3 functions as a second side edge portion. For example, each of the first corner portion C1, the second corner portion C2, the third corner portion C3, the side edge portion S1 and the side edge portion S3 is formed in a rectangular shape. The first pixel electrode 22a includes a lower side L1 as one of the sides extending in the row direction X that defines the first corner portion C1, the side edge portion S1 and the second corner portion C2.

A plurality of pixels PX (PXa and PXc) aligned in the row direction X including the first pixel PXa form a first pixel group. Each of the plurality of pixels PX (PXa and PXc) of the first pixel group includes pixel electrode 22 (22a or 22c) formed similarly to the first pixel electrode 22a.

The second pixel electrode 22b is spaced apart from the first pixel electrode 22a and is adjacent to the first pixel electrode 22a in the columnar direction Y. The second pixel electrode 22b is formed in, for example, a rectangular shape and includes sides extending in the row direction X and sides extending in the columnar direction Y. In the present embodiment, the second pixel electrode 22b is shaped in a square. The second pixel electrode 22b includes a plurality of corner portions and a plurality of side edge portions, similarly to the first pixel electrode 22a. In particular, the second pixel electrode 22b includes a fourth corner portion C4 opposed to the first corner portion C1 of the first pixel electrode 22a. For example, the fourth corner portion C4 is formed in a rectangular shape. The second pixel electrode 22b includes an upper side L2 as one of sides extending in the row direction X. The upper side L2 is opposed to the lower side L1 of the first pixel electrode 22a.

A plurality of pixels PX (PXb and PXd) aligned in the row direction X including the second pixel PXb form a second pixel group. The second pixel group is adjacent to the first pixel group in the columnar direction Y. Each of the plurality of pixels PX (PXb and PXd) of the second pixel group includes pixel electrode 22 (22b or 22d) formed similarly to the second pixel electrode 22b.

The first auxiliary electrode 20a is located over the first pixel electrode 22a and the second pixel electrode 22b from the liquid crystal layer 3. The first auxiliary electrode 20a includes first to third regions R1 to R3. The first region R1 is opposed to the first corner portion C1, the side edge portion S1, the second corner portion C2, the side edge portion S2 and the third corner portion C3 of the first pixel electrode 22a. The second region R2 is displaced from the first to fourth pixel electrodes 22a to 22d. The third region R3 is opposed to the fourth corner portion C4 of the second pixel electrode 22b.

In the present embodiment, the first region R1 is larger than the third region R3.

Each of the first auxiliary electrodes 20a includes a plurality of first regions R1 opposed to the corner portions C1, C2 and C3 and the side edge portions S1 and S3 of the pixel electrodes 22 (22a and 22c) of the plurality of pixels PX (PXa and PXc) in the first pixel group. Each of the first auxiliary electrodes 20a includes a plurality of third regions R3 opposed to the fourth corner portions C4 of the pixel electrodes 22 (22b and 22d) of the plurality of pixels PX (PXb and PXd) in the second pixel group. The second regions R2 of the first auxiliary electrodes 20a are displaced from the pixel electrodes 22 (22a and 22c) of the plurality of pixels PX in the first pixel group and the pixel electrodes 22 (22b and 22d) of the plurality of pixels PX in the second pixel group. The second region R2 of the first auxiliary electrode 20a is located between the first pixel electrode 22a and the third pixel electrode 22c, and between the first pixel electrode 22a and the second pixel electrode 22b.

Next, the alignment treatment executed for the alignment film will be explained.

As shown in FIG. 11, the alignment film 23 is located between the pixel electrodes 22 (22a to 22d) and the liquid crystal layer 3 and is in contact with the liquid crystal layer 3. In the first pixel electrode 22a, a corner of the first corner portion C1 is represented as point P1, a corner of the second corner portion C2 is represented as point P2, a corner of the third corner portion C3 is represented as point P3, and a corner of the fourth corner portion C4 is represented as point P4. The columnar direction Y is a direction from point P1 to point P4, and the row direction X is a direction from point P1 to point P2. In the present embodiment, the alignment film 23 is rubbed in the direction from point P2 to point P4.

However, the direction of rubbing the alignment film 23 is not limited to the rubbing direction D, but can be variously modified. The alignment film 23 may be rubbed in any one of directions within a range of ±90° (−90°≤θ≤+90°) to the direction from point P2 to point P4. The angle θ in the direction from point P2 to point P4 is set to be zero in a state in which the liquid crystal display panel 10 is viewed in a plane.

It is desirable that the rubbing direction D should include the direction from point P2 to point P4 and should be any one of the directions within 90° from the columnar direction Y to the direction opposite to the row direction X. This is because the rubbing direction D does not intersect both the lower side L1 and the right side of the first pixel electrode 22a and because the effect of reducing the occurrence of the edge reverse can be obtained on the same level as the first embodiment.

In contrast, the alignment film 43 is also rubbed. In the present embodiment, too, the liquid crystal display panel 10 adopts the TN mode. For this reason, the alignment film 43 is rubbed in a direction perpendicular to the direction of rubbing the alignment film 23.

The liquid crystal display panel 10 formed as explained above is driven in the same driving method as that of the first embodiment. For example, polarity of a first video signal input to the pixel electrodes 22 (22a and 22c) of the pixels PX (PXa and PXc) in odd-numbered rows is different from polarity of a second video signal input to the pixel electrodes 22 (22b and 22d) of the pixels PX (PXb and PXd) in even-numbered rows in one frame period. A voltage of the same polarity as the polarity of the first video signal is supplied to the first auxiliary electrode 20a every frame period. A voltage of the same polarity as the polarity of the second video signal is supplied to the second auxiliary electrode 20b every frame period.

The liquid crystal display device of the second embodiment constituted as described above comprises the liquid crystal layer 3, the first to fourth pixel electrodes 22a to 22d, and the first and second auxiliary electrodes 20a and 20b. For example, the second pixel electrode 22b is spaced apart from the first pixel electrode 22a and is adjacent to the first pixel electrode 22a in the columnar direction Y. The first auxiliary electrode 20a includes the first region R1 and the second region R2. In one arbitrary frame period, the first video signal is input to the first pixel electrode 22a, the second video signal of the polarity different from the polarity of the first video signal is input to the second pixel electrode 22b, and the voltage of the same polarity as the polarity of the first video signal is supplied to the first auxiliary electrode 20a.

The occurrence of the edge reverse can be avoided effectively by associating the shape of the auxiliary electrodes 20 with the rubbing direction D. For this reason, the liquid crystal display device of the present embodiment can obtain the same advantage as that obtained in the liquid crystal display device of the first embodiment.

Based on the above, the liquid crystal display device capable of suppressing the lowering of the image luminance level can be obtained. Alternatively, the liquid crystal display device excellent in the display quality can be obtained.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

For example, the shape of each of the pixel electrodes 22 (22a, 22b, 22c, and 22d) is not limited to a square, but can be variously modified and may be a rectangular shape. The shape of the pixel electrodes 22 may be a shape other than a rectangular shape. In these cases, too, the same advantages as those of the above-described embodiments can be obtained.

The unit pixel UPX is not limited to the RGBW square pixel, but can be variously modified and may be constituted by, for example, what is called RGBW lateral stripe pixels (i.e., pixels formed by aligning four RGBW rectangular pixels (pixel electrodes) in a stripe shape).

Alternatively, the unit pixel UPX may be constituted by what is called RGB lateral stripe pixels (i.e., pixels formed by aligning three rectangular pixels (pixel electrodes) of general three primary colors RGB in a stripe shape). Furthermore, the unit pixel UPX may be constituted by pixels of four or more colors including a yellow (Y) pixel or both a white (W) pixel and the Y pixel.

The above-described embodiments are not limited to the above-explained liquid crystal display device, but can be applied to various liquid crystal display devices.

What is claimed is:

1. A liquid crystal display device comprising:
a liquid crystal layer;
a first pixel electrode which comprises a first corner portion, a second corner portion adjacent to the first corner portion, and a side edge portion located between the first corner portion and the second corner portion, and in which a first video signal is input;
a second pixel electrode which is spaced apart from the first pixel electrode and adjacent to the first pixel electrode in a columnar direction, and in which a second video signal of polarity different from polarity of the first video signal is input; and
an auxiliary electrode which is located over the first pixel electrode and the second pixel electrode from the liquid crystal layer, which includes a first region opposed to the first corner portion, the side edge portion and the second corner portion, and a second region located between the first pixel electrode and the second pixel electrode in the columnar direction, and to which a voltage of the same polarity as the polarity of the first video signal is supplied,
wherein
the second pixel electrode comprises a third corner portion opposed to the second corner portion, a fourth corner portion opposed to the first corner portion, and the other side edge portion located between the third corner portion and the fourth corner portion,
the auxiliary electrode further includes a third region opposed to the third corner portion, the other side edge portion and the fourth corner portion, and
the first region is larger than the third region.

2. A liquid crystal display device comprising:
a liquid crystal layer;
a first pixel electrode which comprises a first corner portion, a second corner portion adjacent to the first corner portion, a first side edge portion located between the first corner portion and the second corner portion, a third corner portion adjacent to the second corner portion, and a second side edge portion located between the second corner portion and the third corner portion, and in which a first video signal is input;
a second pixel electrode which is spaced apart from the first pixel electrode and adjacent to the first pixel electrode in a columnar direction, and in which a second video signal of polarity different from polarity of the first video signal is input; and
an auxiliary electrode which is located over the first pixel electrode and the second pixel electrode from the liquid crystal layer, which includes a first region opposed to the first corner portion, the first side edge portion, the second corner portion, the second side edge portion and the third corner portion, and a second region displaced from the first pixel electrode and the second pixel electrode, and to which a voltage of the same polarity as the polarity of the first video signal is supplied.

3. The device of claim 2, further comprising:
an alignment film which is located between the first and second pixel electrodes and the liquid crystal layer, which is in contact with the liquid crystal layer, and which is rubbed,
wherein
the first pixel electrode is formed in a rectangular shape, and further comprises a fourth corner portion different from the first to third corner portions, and a side in a row direction defining the first corner portion, the side edge portion and the second corner portion,
the second pixel electrode is formed in a rectangular shape, and includes the other side of the row direction opposed to the side, and
a direction of the rubbing is any one of directions within a range of ±90° to a direction from a corner of the second corner portion to a corner of the fourth corner portion.

4. The device of claim 3, wherein
the columnar direction is a direction from a corner of the first corner portion to a corner of the fourth corner portion,
the row direction is a direction from the corner of the first corner portion to a corner of the second corner portion, and
the direction of the rubbing is any one of directions within a range of 90° from the columnar direction to a direction opposite to the row direction, that include a direction from the corner of the second corner portion to the corner of the fourth corner portion.

5. The device of claim 2, further comprising:
a first pixel group including a plurality of pixels aligned in the row direction; and
a second pixel group which includes a plurality of other pixels aligned in the row direction and which is adjacent to the first pixel group in the columnar direction,
wherein
each of the plurality of pixels of the first pixel group includes the first pixel electrode,
each of the plurality of other pixels of the second pixel group includes the second pixel electrode,
the auxiliary electrode is extended in the row direction, and includes a plurality of other first regions opposed to the first corner portion, the first side edge portion, the second corner portion, the second side edge portion and the third corner portion of the first pixel electrode in each of the pixels of the first pixel group, and
the second region is displaced from the first pixel electrode in each of the pixels of the first pixel group and the second pixel electrode in each of the pixels of the second pixel group.

6. The device of claim 2, wherein
the second pixel electrode comprises the other corner portion opposed to the first corner portion, and
the auxiliary electrode further includes a third region opposed to the other corner portion.

7. The device of claim 6, wherein
the first region is larger than the third region.

8. The device of claim 2, further comprising:
an insulating film located between the auxiliary electrode, and the first and second pixel electrodes.

* * * * *